UNITED STATES PATENT OFFICE.

WILLIAM B. HUGHES, OF PHILADELPHIA, PENNSYLVANIA.

MANUFACTURE OF STEEL BY THE OPEN-HEARTH PROCESS.

SPECIFICATION forming part of Letters Patent No. 694,752, dated March 4, 1902.

Application filed June 5, 1901. Serial No. 63,229. (No specimens.)

*To all whom it may concern:*

Be it known that I, WILLIAM B. HUGHES, a citizen of the United States, residing in Philadelphia, Pennsylvania, have invented certain Improvements in the Manufacture of Steel by the Open-Hearth Process, of which the following is a specification.

My invention consists of an improvement in the manufacture of steel by the open-hearth process, the object of my invention being to increase the production without the necessity of using furnaces of inconveniently large capacity. This object I attain by premelting, outside of the furnace, oxid of iron and mixing the same with lime to form a highly-oxidizing basic slag and then bringing such molten slag into contact with the bath of molten iron on the hearth of the furnace.

The ordinary method of manufacturing steel in an open-hearth furnace is to first charge upon the basic-lined hearth pig-iron or scrap and pig-iron, together with oxid of iron (such as iron ore, mill-scrap, or furnace-cinder) mixed with lime, and when this has been melted to add from time to time such additional quantities of oxid of iron and lime as may be necessary, said compounds combining with the metalloids of the iron and causing a reaction, whereby the iron is precipitated and the silicon and phosphorus largely eliminated and combined with the slag, which floats upon the body of the metal in the furnace, this slag or any desired portion of it being then run off and the charge then subjected to the action of the heating-flame for the purpose of raising the temperature of the metal to the tapping-point, the carbon contents of the metal being at the same time reduced to the desired percentage. It has also been proposed to partially charge the furnace with the pig-iron, iron oxid, and lime and after the charge has been melted and the metal properly purified to pour into the same and through the slag covering a quantity of impure molten iron, such as blast-furnace metal or melted pig-iron, a portion only of the finally-purified charge being withdrawn from the furnace in tapping the same, so as to always retain in the furnace a partial charge of purified iron or steel, into which the remainder of the charge of impure iron can be poured through the slag covering, the impure slag being withdrawn from time to time and fresh additions of oxid of iron and lime being made, so as to maintain the slag in proper condition for combination with the metalloids of the iron.

In order to work furnaces to their maximum capacity, and thereby render unnecessary the use of the very large and expensive furnaces, such as have recently been designed, I avoid the waste of time heretofore required for heating the basic additions on the hearth of the furnace, premelt the oxid of iron and lime in a separate furnace, so as to form a highly-oxidizing molten basic slag, and then add this molten slag to the bath of molten iron on the hearth of the furnace, thereby accomplishing the removal of silicon and phosphorus from the iron without any risk of injury to the hearth or lining, such as is likely to result when the oxid of iron and lime are melted in the furnace. Further than this the molten slag acts more uniformly than if its constituents were charged into the furnace in a cold state, and in the reaction and discharge of slag the loss of uncombined oxid, which is sometimes carried off mechanically with the slag, is prevented.

I may use any type of open-hearth furnace provided with means for withdrawing the metal and slag, preferring, however, a basic-lined furnace of the tilting type. In this furnace I prefer to start the operation in the ordinary way—that is to say, by charging it with pig-iron and scrap and with oxid of iron and lime—and after the metal has been properly purified by the extraction of silicon, phosphorus, and other impurities therefrom I withdraw almost all of the slag thus formed and heat the remaining metal charge to the tapping temperature, at the same time properly reducing its carbon contents, making such additions as may be necessary for this purpose. When this treatment is concluded, I withdraw a portion of the purified charge and then pour into the furnace a proper charge of molten pig-iron, blast-furnace metal, or the like, and either while the same is being charged or immediately thereafter pour into the furnace the desired quantity of the highly-oxidizing liquid basic slag formed by premelting the oxid of iron and lime, the result being a quick reaction, which effects rapid elimination of the impurities and the ejection of a large amount of slag from the metal bath. This slag, or almost all of it, is then withdrawn, so that the flame can act most effectively upon the metal remaining in the furnace for the purpose of raising the temperature of the same to the tapping-point, the removal of the remaining metalloids and the reduction of the carbon contents of the metal to the required percentage being at the same time effected and such additions being made as may be necessary to accomplish the desired result, and after the operation is complete any desired portion of the finished charge is withdrawn and the operations repeated indefinitely.

Instead of withdrawing only a portion of the finished charge of metal the entire contents of the furnace—metal and slag—may be withdrawn, either together or separately, after the completion of the process, so as to prevent the destructive action of the slag on the bottom of the furnace, and after making the necessary repairs the furnace may be charged with molten pig-iron or other impure metal and with the highly-oxidizing liquid basic slag formed by premelting the oxid of iron and lime and the process carried on as before described.

To prepare the basic slag, which must be of a highly-oxidizing nature, I prefer to use a cupola-furnace, into which I charge the mixture of ore or other iron oxid and limestone, together with sufficient coke to flux them at a temperature which will melt them, but relatively so low that such melting will not be accompanied by a considerable reduction of iron from the oxid, which would be objectionable.

The melted slag is tapped from the cupola as required, and the cupola is preferably of sufficient melting capacity to supply a number of open-hearth furnaces.

It is possible to carry out my invention by forming the highly-oxidizing basic slag in the open-hearth furnace by charging the lime onto the surface of the bath of molten pig-iron and then pouring into the furnace the proper quantity of premelted iron oxid; but it is preferable to melt and flux together the lime and oxid in a separate furnace in the manner before described.

Having thus described my invention, I claim and desire to secure by Letters Patent—

1. The method herein described of making open-hearth steel which consists in providing the hearth of the furnace with a bath of purified molten iron, premelting, outside of the furnace, oxid of iron and mixing said molten oxid with lime to form thereby a highly-oxidizing liquid basic slag, pouring into the bath of purified molten iron on the hearth of the furnace a charge of impure molten iron and then bringing the molten slag into contact with the full bath of molten iron on the hearth of the furnace so as to remove impurities therefrom, substantially as specified.

2. The method herein described of making open-hearth steel which consists in providing the hearth of the furnace with a bath of purified iron, premelting and fluxing together, outside of the furnace, oxid of iron and lime to form a highly-oxidizing liquid basic slag, pouring into the bath of purified molten iron on the hearth of the furnace a charge of impure molten iron and charging the molten slag into the full bath of molten iron on the hearth of the furnace so as to remove impurities therefrom, substantially as specified.

3. The method herein described of making open-hearth steel which consists in providing the hearth of the furnace with a bath of purified iron substantially without slag covering, premelting, outside of the furnace, oxid of iron and mixing said molten oxid with lime to form thereby a highly-oxidizing liquid basic slag, pouring into the bath of purified molten iron on the hearth of the furnace a charge of impure molten iron and then bringing the molten slag into contact with the full bath of molten iron on the hearth of the furnace so as to remove impurities therefrom, substantially as specified.

4. The method herein described of making open-hearth steel which consists in providing the hearth of the furnace with a bath of purified molten iron, substantially without slag covering, premelting and fluxing together, outside of the furnace, oxid of iron and lime to form a highly-oxidizing liquid basic slag, pouring into the bath of purified molten iron on the hearth of the furnace a charge of impure molten iron and charging the molten slag into the full bath of molten iron on the hearth of the furnace so as to remove impurities therefrom, substantially as specified.

5. The method herein described of making open-hearth steel which consists in providing the hearth of the furnace with a bath of purified molten iron, premelting, outside of the furnace, oxid of iron and mixing said molten oxid with lime to form thereby a highly-oxidizing liquid basic slag, pouring into the bath of purified molten iron on the hearth of the furnace a charge of impure molten iron, then bringing the molten slag into contact with the full bath of molten iron on the hearth of the furnace so as to remove impurities therefrom, and then withdrawing a portion of the purified metal, leaving the remainder in the furnace to provide the starting-bath for a following operation, substantially as specified.

6. The method herein described of making open-hearth steel which consists in providing the hearth of the furnace with a bath of purified molten iron, premelting and fluxing together, outside of the furnace, oxid of iron and lime to form a highly-oxidizing liquid basic slag, pouring into the bath of purified molten iron on the hearth of the furnace a charge of impure molten iron, charging the molten slag into the full bath of molten iron on the hearth of the furnace so as to remove impurities therefrom, and then withdrawing a portion of the purified metal, leaving the remainder in the furnace to provide the starting-bath for a following operation, substantially as specified.

7. The method herein described of making open-hearth steel which consists in providing the hearth of the furnace with a bath of purified molten iron substantially without slag covering, premelting, outside of the furnace, oxid of iron and mixing said molten oxid with lime to form thereby a highly-oxidizing liquid basic slag, pouring into the bath of purified molten iron on the hearth of the furnace a charge of impure molten iron, then bringing the molten slag into contact with the full bath of molten iron on the hearth of the furnace so as to remove impurities therefrom, and then withdrawing a portion of the purified metal, leaving the remainder in the furnace to provide the starting-bath for a following operation, substantially as specified.

8. The method herein described of making open-hearth steel which consists in providing the hearth of the furnace with a bath of purified molten iron substantially without slag covering, premelting and fluxing together, outside of the furnace, oxid of iron and lime to form a highly-oxidizing liquid basic slag, pouring into the bath of purified molten iron on the hearth of the furnace a charge of impure molten iron, charging the molten slag into the full bath of molten iron on the hearth of the furnace so as to remove impurities therefrom, and then withdrawing a portion of the purified metal, leaving the remainder in the furnace to provide the starting-bath for a following operation, substantially as specified.

9. The method herein described of making open-hearth steel which consists in providing the hearth of the furnace with a bath of purified iron, premelting, outside of the furnace, oxid of iron and mixing said molten oxid with lime to form thereby a highly-oxidizing liquid basic slag, pouring into the bath of purified molten iron on the hearth of the furnace a charge of impure iron, then bringing the molten slag into contact with the full bath of molten iron on the hearth of the furnace so as to remove impurities therefrom, then withdrawing so much of the impurity-containing slag as may be necessary to permit of the rapid heating of the metal, then reducing the carbon to the desired percentage and raising the temperature of the metal to the tapping-point, and finally tapping off only a portion of the purified metal, leaving the remainder in the furnace to provide a starting-bath for the following operation, substantially as specified.

10. The method herein described of making open-hearth steel which consists in providing the hearth of the furnace with a bath of purified molten iron, premelting and fluxing together, outside of the furnace, oxid of iron and lime to form a highly-oxidizing liquid basic slag, pouring into the bath of purified molten iron on the hearth of the furnace a charge of impure molten iron, charging the molten slag into the full bath of molten iron on the hearth of the furnace so as to remove impurities therefrom, then withdrawing so much of the impurity-containing slag as may be necessary to permit of the rapid heating of the metal, then reducing the carbon to the desired percentage and raising the temperature of the metal to the tapping-point, and finally tapping off only a portion of the purified metal, leaving the remainder in the furnace to provide a starting-bath for the following operation, substantially as specified.

11. The method herein described of making open-hearth steel which consists in providing the hearth of the furnace with a bath of purified molten iron substantially without slag covering, premelting, outside of the furnace, oxid of iron and mixing said molten oxid with lime to form thereby a highly-oxidizing liquid basic slag, pouring into the bath of purified molten iron on the hearth of the furnace a charge of impure molten iron, then bringing the molten slag into contact with the full bath of molten iron on the hearth of the furnace so as to remove impurities therefrom, then withdrawing so much of the impurity-containing slag as may be necessary to permit of the rapid heating of the metal, then reducing the carbon to the desired percentage and raising the temperature of the metal to the tapping-point, and finally tapping off only a portion of the purified metal, leaving the remainder in the furnace to provide a starting-bath for the following operation, substantially as specified.

12. The method herein described of making open-hearth steel which consists in providing the hearth of the furnace with a bath of purified molten iron substantially without slag covering, premelting and fluxing together, outside of the furnace, oxid of iron and lime to form a highly-oxidizing liquid basic slag, pouring into the bath of purified molten iron on the hearth of the furnace a charge of impure molten iron, charging the molten slag into the full bath of molten iron on the hearth of the furnace so as to remove impurities therefrom, then withdrawing so much of the impurity-containing slag as may be necessary to permit of the rapid heating of the metal, then reducing the carbon to the desired percentage and raising the temperature of the metal to the tapping-point, and finally tapping off only a portion of the purified metal, leaving the remainder in the furnace to provide a starting-bath for the following operation, substantially as specified.

In testimony whereof I have signed my name to this specification in the presence of two subscribing witnesses.

WILLIAM B. HUGHES.

Witnesses:
F. E. BECHTOLD,
JOS. H. KLEIN.